Dec. 1, 1964  G. M. HARRIS  3,159,516
CALENDERING METHOD AND PRODUCTS MADE THEREBY
Filed Dec. 17, 1958  2 Sheets-Sheet 1
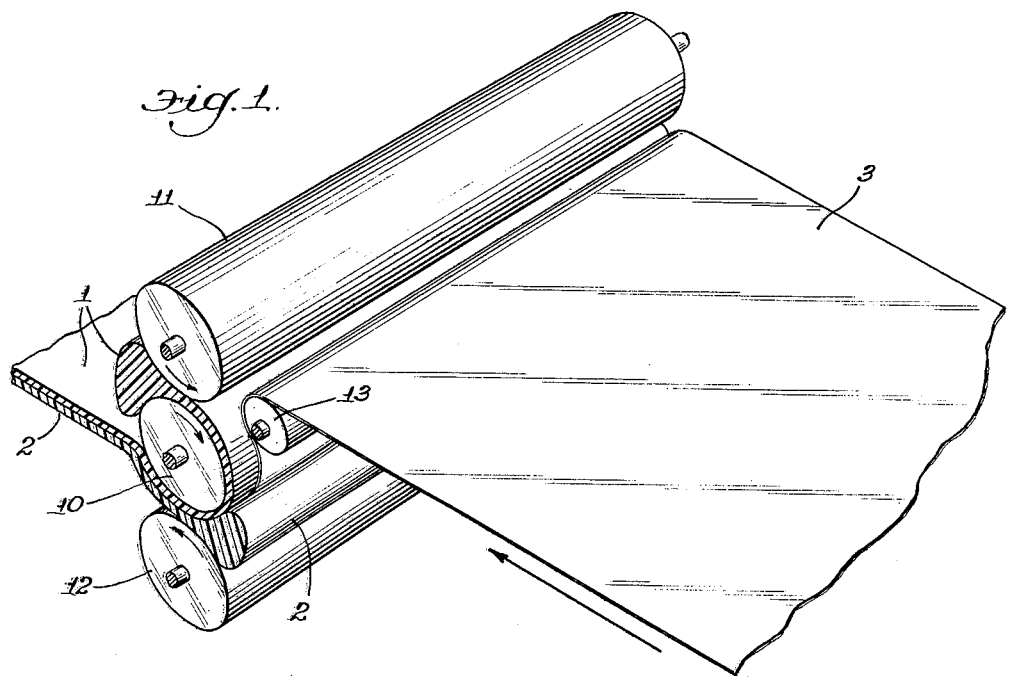
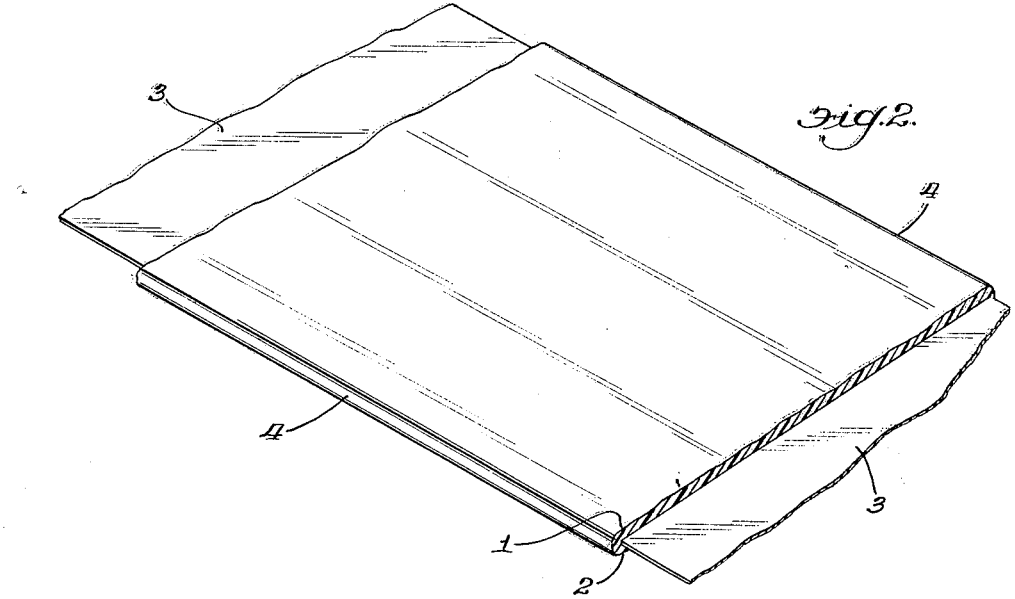
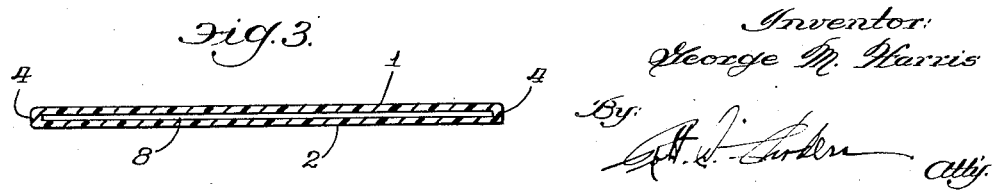
Inventor:
George M. Harris Dec. 1, 1964  G. M. HARRIS  3,159,516
CALENDERING METHOD AND PRODUCTS MADE THEREBY
Filed Dec. 17, 1958  2 Sheets-Sheet 2
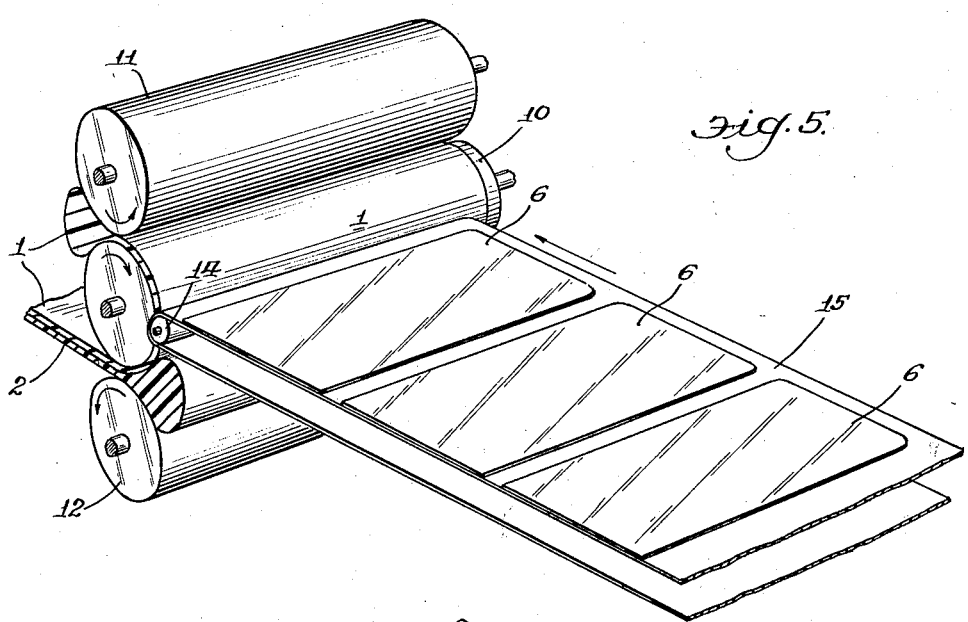
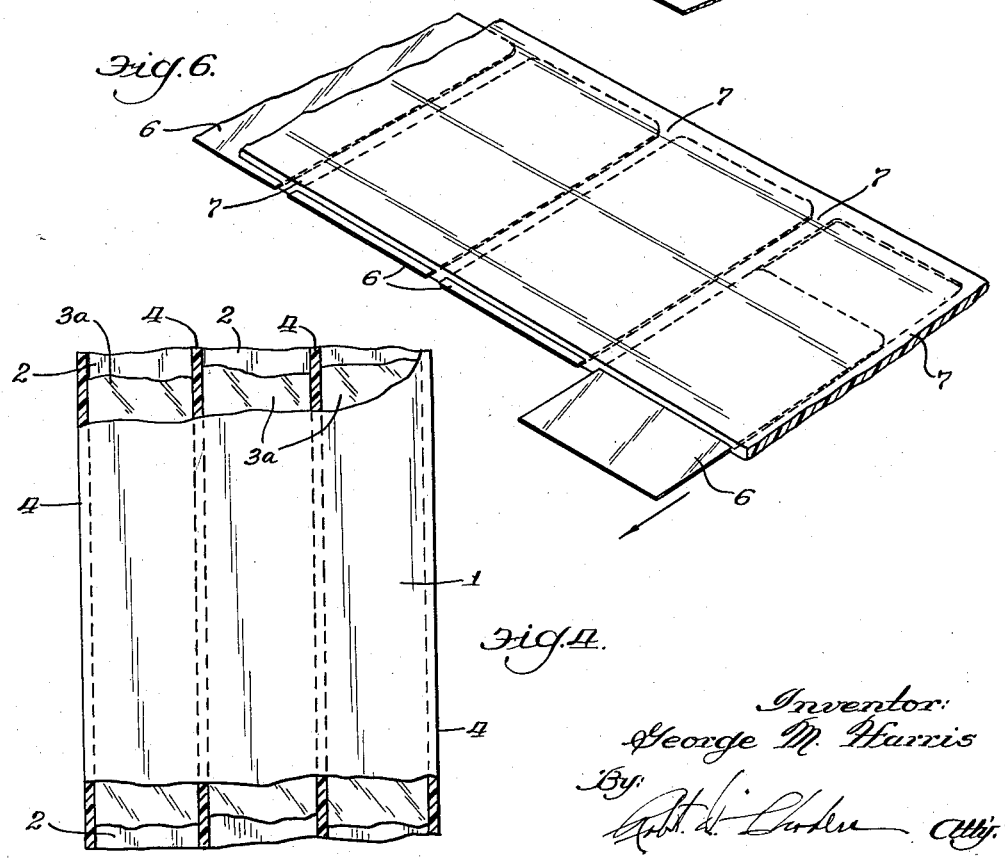
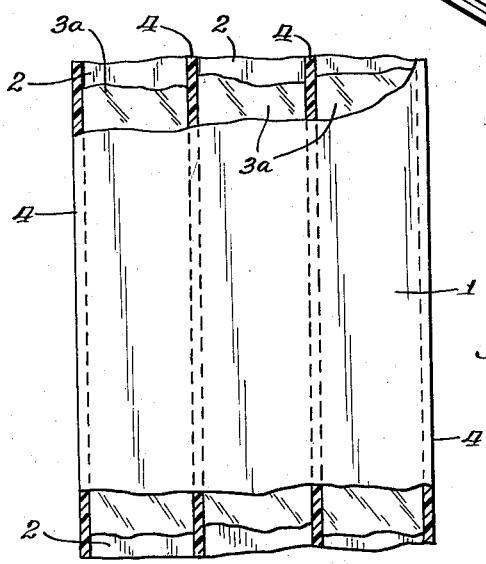
Inventor:
George M. Harris United States Patent Office 3,159,516
Patented Dec. 1, 1964

3,159,516
CALENDERING METHOD AND PRODUCTS
MADE THEREBY
George M. Harris, Chicago, Ill., assignor to The
Kendall Company, Boston, Mass., a corporation of
Massachusetts
Filed Dec. 17, 1958, Ser. No. 781,120
10 Claims. (Cl. 156—243)

This invention relates to a method of calendering thermoplastic materials. More particularly, this invention relates to a single-pass calendering and laminating operation for processing bulk thermoplastic materials directly into hollow articles, sheets or films laminated together only in certain predetermined portions thereof.

Calendering operations have been considered as restricted to formation of unitary, planar articles of the type exemplified by films and sheets. As far as is known, calendering operations have not heretofore been used to fabricate articles which can assume three-dimensional proportions, for example hollow articles such as bags, tubing, inflatable articles, and the like, directly from bulk form of the thermoplastic materials. Further, calendering processes, beginning with bulk materials as a starting material, have been restricted to the formation of films or sheets no wider than the calendering surfaces.

Conventionally, articles of the aforementioned type use films which are produced independently of other fabricating steps. Thus, the fabrication of such items ordinarily involves several separate and independent steps, including the production of the films, transfer of the films to a laminating apparatus, arranging the films with respect to each other, as by superimposing one upon the other, laminating the films together in a desired pattern and a subsequent cutting or trimming operation. In some instances, as in the manufacture of bags, the thermoplastic film may be cut into the desired shape in superimposed relationship to each other and then laminated together around the edges thereof by pressing the same together and reheating to a temperature sufficient to cause fusion between the films along the edge areas.

These processes for forming hollow articles and the like composed of thermoplastic films involve considerable material handling, require separate laminating or sealing apparatus and ordinarily do not take advantage of the heat put into the thermoplastic material during the film forming operation. The pressing or heating cycles necessary to accomplish lamination preclude a continuous and rapid production of articles having irregular or non-parallel laminated areas.

The heat or pressure applied during the lamination of preformed film may cause deformation of the film in the laminated areas, in some cases even resulting in a puckering or crimping of the films within and along the laminated areas. The maximum thickness of the laminated area does not exceed the sum of the thicknesses of the films, and oftentimes the laminated areas may be thinner than the sum of the film thicknesses due to flow of these areas under the compressive forces of a laminating operation. Moreover, lamination of preformed films may change physical characteristics of certain films in the laminated areas; for example, the heat or pressure, or both, employed in a laminating operation may change or completely destroy orientation or crystallinity in the laminated and adjacent areas of some thermoplastic films.

Thus, the production of articles of the aforementioned type from preformed oriented or crystalline thermoplastic films may display non-uniform orientation or crystallinity between the non-laminated portions and the laminated areas of the films.

A principal object of this invention is a continuous method of producing, directly from bulk thermoplastic material, articles composed of films or sheets laminated together in certain predetermined patterns. This invention provides a rapid method, capable of continuous operation, for directly calendering hollow articles, for example, from bulk thermoplastic materials. In addition, this invention includes as an object thereof a calendering process for producing films or sheets having an overall width greater than the width of the surfaces upon which the bulk thermoplastic material is calendered. In the practice of this invention, intermediate handling of preformed film prior to article fabrication and separate lamination operations are eliminated. Furthermore, the heat necessary for film formation is utilized to accomplish lamination of the films in the predetermined patterns.

A further object of this invention is production of articles of the type herein described wherein the laminated areas of the films are thicker than the sum of the thicknesses of the films. In addition, it is an object of this invention to produce said articles wherein the laminated areas are stronger than that ordinarily obtained by the lamination of preformed films, the articles of this invention being free of deformation, such as puckering or crimping, within and along the laminated areas. A highly desirable object of this invention is articles of the type herein described having substantially similar crystallinity and/or orientation throughout the laminated and non-laminated areas of the articles.

In its broadest aspect, this invention comprises maintaining portions of the thermoplastic film or sheets separate from each other while laminating the films or sheets together in certain predetermined portions during a single pass calendering operation wherein the films are produced in confronting superimposed relationship to each other directly from bulk thermoplastic material. The method of this invention more specifically comprises introducing a separatory foil of a predetermined pattern or shape at a nip or bight, formed by a moving carrying surface and an adjacent converging surface, between a molten bulk of thermoplastic material deposited thereat and a thermoplastic first film which is adhered to said moving carrying surface and carried thereon through said nip, said first film being calendered directly from a molten bulk of material onto said moving carrying surface. The separatory foil enters this nip and passes through it so that the product emerging from the nip is a pair of thermoplastic films in superimposed relationship to each other with the separatory foil positioned or sandwiched in between the confronting surfaces of the two films. The separatory foil is separable from either both of the films or is separable from only one as will be explained below. One of the films is the aforesaid first film and the other film is a second film which is calendered from the bulk of thermoplastic material at the aforementioned nip.

The separatory foil pattern is not coextensive with the entire surfaces of the films being formed, the pattern being related to the length and width of the films so that portions of the films overlap or extend beyond edges of the foil pattern. These overlapping portions of the films are in face-to-face contact with each other and become fused together around or beyond edges of the foil pattern simultaneously with the formation of the second film, the foil pattern maintaining the other portions of the films separate from each other. Since the first film also is produced directly from bulk thermoplastic material on the carrying surface, the resulting product is comprised of superimposed thermoplastic films fusion laminated together in a pattern predetermined by the pattern of the separatory foil, said product being directly produced from bulk thermoplastic material in a single-pass calendering operation.

The first film is calendered directly from bulk thermoplastic material onto said moving carrying surface by depositing molten bulk material at a nip between the carrying surface and another converging surface spaced apart from and preceding the aforementioned nip at which the second film is formed. This first film is adhered to the moving carrying surface and enters the nip at which the second film is formed while still in a heated condition. The exposed surface of this first film, that is, the film surface opposite that adhered to the moving carrying surface, is in a somewhat tacky condition characteristic of thermoplastic materials subjected to calendering temperatures. It is preferable, and practically essential for smooth introduction of the foil into the next nip, that the foil be positioned against the exposed surface of the first film before passing through the next nip. The tacky character of the exposed surface of the first film serves to hold the foil in place, thereby providing a carrying means to lead the film into the next nip.

The films comprising the laminated products made in accordance with this invention are composed of any thermoplastic material suitable or adapted for calendering. Representative examples include, in addition to natural rubber, such synthetic elastomers as polyethylene, halogenated derivatives thereof, polybutadiene, polyisobutylene, styreneisobutylene copolymers, polypropylene, poly-p-xylene, polyesters such as polyethylene terephthalate, polyamides such as polyhexamethylene adipamide, polyvinylchloride, and vinyl chloride-vinyl acetate copolymers, to name a few. The thermoplastic materials may be blended with other materials such as plasticizers, stabilizers, dyes, pigments, or fillers for a variety of purposes as well known in the calendering art. The individual films produced and laminated together in accordance with this invention may be composed of the same or different thermoplastic materials.

The separatory foil pattern must not become permanently bonded to more than one of the confronting surfaces of the films under the particular conditions of the calendering operation; that is, the separatory foil pattern must be free of permanent bonding or attachment to at least one of the films, the principal function of the separatory foil being to maintain the two films separate from each other according to the pattern predetermined by the configuration of the foil. In the instance where the separatory foil becomes bonded to one of the films, as by being laminated on one side thereof to only one of the films, the surface of one side of the foil must be susceptible to permanent bonding to, for example, by lamination, one of the confronting surfaces of one of the films. In some instances it may be desirable to employ a separatory foil pattern comprising two plies of the foil pattern superimposed upon the other, each of which can be laminated to the adjacent confronting surfaces of the films; the two plies of the foil pattern remain separate from each other, thereby functioning to maintain the films separate from each other in the predetermined pattern of the foil, and also capable of serving as a reinforcement for the film.

The composition of the separatory foil may vary considerably, depending upon whether the separatory foil is to be releasably adherent to both films or is to be bonded to only one of the films and releasable or separable from the other of said films, and depending further upon the composition of the thermoplastic films, which in turn dictates at least the minimum operating temperatures of the calendering process. With these factors known, therefore, one familiar with calendering processes can choose an appropriate separatory foil for the purposes of this invention. The separatory foil itself may be a thermoplastic material, but in such instances its melting or softening point must be substantially higher than the melting or softening points of the thermoplastic films and above the temperatures used in the calendering process. Materials which have proven satisfactory for use as a releasable separatory foil, that is, one which does not permanently bond to the films, in the case of producing polyethylene structures according to this invention, at temperatures as high as about 300° C. and above are cellophane, cellulose acetate and polyethylene terephthalate. Aluminum foil may also be used in addition to other materials which may be coated with a release-type coating, such as paper coated on both sides with silicone resins. The silicone resins are suitable materials for coating only one side of materials which may be otherwise laminatable to the thermoplastic films to render them laminatable on only one side thereof, the uncoated side. For example, paper coated with a silicone resin on only one side thereof can then be used as a one-side laminatable separatory foil (that is, a separatory foil which can be bonded to one of the films but remains separable from the confronting surface of the other film).

Although the releasable separatory foil may initially adhere to the tacky surface of the first film, as explained above, the foil is released from the films when the films are cooled to a normal non-thermoplastic state after calendering. The separatory foil should preferably be substantially smooth, although slightly embossed surfaces of the foil can be used to impart interestingly decorative designs on the surface of the films, if desired. Deeply embossed surfaces on both sides of the foil may cause the foil to become attached to the films, apparently by a mechanical interlocking of the protruding or recessed portions of the foil with the films. The separatory foil pattern, of course, may or may not be removable from between the films, even though not adhering thereto, depending upon the configuration of the pattern. In the case of tubing or bags wherein the calendered structure has at least one open end, the foil pattern if not bonded to one of the films may be removed, simply by pulling the foil from between the films, and is available to be used again.

The invention will now be more particularly described with reference to the drawings in which:

FIG. 1 is a perspective view of a semi-diagrammatic sketch of a calendering apparatus suitable for carrying out the process of this invention;

FIG. 2 is a planar view, partly in cross-section, of a portion of a product produced by the process illustrated with reference to FIG. 1;

FIG. 3 is a cross-sectional end view of FIG. 2;

FIG. 4 is a view similar to that of FIG. 2 of a multi-tubular product produced by the process of this invention; and FIG. 5 is a modified form of the apparatus shown in FIG. 1 suitable for continuously producing articles having irregular or non-parallel laminated edges, such as shown in FIG. 6.

The apparatus of FIG. 1 is shown in the process of manufacturing tubing, of the type illustrated in FIGS. 2 and 3, directly from bulk thermoplastic material in a single-pass calendering operation. The process will be described with specific reference to polyethylene as the thermoplastic material and cellophane as the releasable separatory foil. Referring to FIG. 1, the calendering apparatus comprises a heated center roll 10 and heated top and bottom rolls 11 and 12, respectively. The surface temperature of each of the rolls 11 and 12 is about 340° F. and the surface temperature of roll 10 is about 190° F. A bulk of polyethylene 1 is deposited in molten condition at a first nip formed by the surface of roll 11 converging with the moving carrying surface of roll 10. The film which is formed from the bulk of polyethylene 1 is also designated by the numeral 1 in the drawings. At the beginning of the process the center roll 10 is rotated in the direction shown by the arrow in the drawings. The film 1 emerges from the first nip adhered to and carried on the surface of the center roll 10 through a second nip formed by the surface of the bottom roll 12 converging with the carrying surface of the roll 10. Another bulk of molten polyethylene 2 is deposited at this second nip to form a second film, designated also by the numeral 2. As thus far described, the film 2 is formed directly in contact with the film 1 and the thickness of film 1 is determined by the gap between the surfaces of rolls 10 and 11 and the thickness of film 2 is determined by the gap between the surface of roll 12 and the outer surface of film 1 being carried on roll 10. Since the temperature of the bulk polyethylene 2 is above the melting point of the polyethylene, and hence above the melting point of film 1, the film 2, as formed in contact with film 1, becomes fused to film 1. Initially, the top and bottom rolls 11 and 12 are kept stationary, as may be preferred in starting up the process, and then may be rotated at the desired speed in the direction shown by the arrows in the drawings.

With a laminated pair of films being produced in the manner described, a preformed cellophane foil 3 is introduced into the second nip, between film 1 and the bulk polyethylene 2. For smooth introduction of the foil 3 between the film 1 and the bulk polyethylene 2, as indicated previously, the foil 3 is first brought into contact with the exposed surface of film 1 at a point between the first and second nips, as shown in FIG. 1. This may be accomplished by bringing the foil 3 around the feeder or applicator roll 13 which is so positioned with respect to the exposed surface of film 1 to apply the foil 3 into direct contact with the exposed surface of film 1. The exposed surface of film 1 is still in a thermally softened condition and the tacky character of the thermoplastic material serves to hold the foil 3 in place and lead it between the bulk polyethylene 2 and the film 1. The foil 3 continues to travel with film 1 and passes through the nip between rolls 10 and 12 interposed between film 1 and film 2 being formed at the nip.

As illustrated in FIG. 1, the width of the cellophane foil 3 is less than the width of both of the films 1 and 2 being formed on the calender. The foil 3 is positioned on film 1 and with respect to film 2 so that the longitudinal edges of the films overlap beyond the longitudinal edges of foil 3. The films 1 and 2 are now fused together only in the areas of the overlap which extend beyond the longitudinal edges of the foil 3. The cellophane foil does not fuse to either of the films in the areas of contact with the films and serves to maintain the films separate from each other. The product thus produced and stripped off the center roll 10 after emergence from the second nip is a pair of continuously calendered superimposed films which are fusion laminated along the longitudinal edges.

FIG. 2 graphically represents a portion of the tubing produced in the manner just described, showing the foil 3 separating the central portion of film 1 from the central portion of film 2. The fused portions 4 along the longitudinal edges of the calendered product terminate along a line adjacent to the longitudinal edges of the separatory foil. The releasable separatory cellophane foil 3 does not become fused to either of the films and is easily removable from between the central portions of films 1 and 2, simply by pulling on the foil.

FIG. 3 is a cross-sectional end view of the tubing shown in FIG. 2, with the separatory foil 3 removed. As indicated in FIG. 3, the fused edge portions are thicker than the sum of the thicknesses of the top film 1 and bottom film 2. It has been observed that, in a product such as that shown in FIG. 3, the thickness of the laminated areas 4 is about equal to the sum of the thickness of each of the films and the thickness of the separatory foil. This is accounted for by the observation that, under the operating conditions just described, the gap at the second nip is greater at the edge portions of film 1 than at the central portion thereof on which the separatory foil 3 is positioned. The difference in the width of this gap at these respective portions is equivalent to the thickness of the separatory foil 3. Accordingly, the film 2 being formed at this second nip conforms to the width of the gap and forms the laminated portions 4 with the film 1 to the thickness described.

Under conditions suitable for imparting orientation to each of the polyethylene films, the laminated portions 4 will also have the same type of orientation as in the central portions of the films. To the extent that the degree of crystallinity of some thermoplastic materials may depend upon the heat treatment to which the films are subjected, the degree of crystallinity in the laminated portions can be substantially similar to that in the central portions of the films. Since the films are in the process of being formed while being laminated together the product is substantially free of deformation such as crimping or puckering within or along the areas adjacent to the laminated portions 4. Under the proper operating conditions to impart substantially the same degree of orientation in both the laminated and central portions of the tubing, the laminated portions 4 will be at least as strong as the central portions of the films which constitute the walls of the tubing.

The width of the fused edges 4 of the tubing is determined by the width of each of films 1 and 2 and the width of the separatory foil 3. In the manufacture of tubing in accordance with this invention the width of the separatory foil must always be less than the width of each of the films, and, as previously explained, must be positioned with respect to both films so that the longitudinal edges of the film overlap or extend beyond the longitudinal edges of the separatory foil.

The polyethylene tubing illustrated in FIG. 3 is, of course, pliable and can conform to material passing through the channel 8. The product is ideally suited for the transportation of fluids and the like from one point to another.

Tubing can be made described wherein the separatory foil is laminated directly onto one of the films by substituting, in place of the cellophane foil 3, a suitable fabric or paper, coated with a silicone resin on one side and uncoated on the other side. In this case the separatory foil can be laminated to the confronting surface of one of the films, the silicone resin coating serving to separate the other film therefrom. Other modifications include the introduction of a pair of such silicone coated fabric or paper strips into the second nip between rolls 10 and 12 of the calender apparatus of FIG. 1. The strips are positioned in superimposed relationship to each other with the coated sides in face-to-face contact. In this manner, the strips can be laminated to the films to produce a tubing having side walls similar to the films 1 and 2 shown in FIGS. 2 and 3, but reinforced by the strips. Of course, the same result can be realized by placing uncoated or untreated strips of paper or fabric on each side of the cellophane foil 3. The cellophane foil then serves as a carrying means for the laminable materials and also functions to prevent fusion of the films 1 and 2 at their confronting faces if the thermoplastic material strikes through the interstices of the fabric or paper.

It will be readily apparent that the principles of this invention can also be employed to calender very wide sheets, even sheets wider than the widths of the calendering surfaces. Referring to FIG. 1, this may be accomplished, for example, by shifting the feeder roll 13 toward one end of the calender roll 10 so that a longitudinal edge of the separatory foil 3 is exactly coincident with, or extending beyond, adjacent longitudinal edges of the films 1 and 2 as the foil 3 is carried through the second nip. The films emerging from the nip between rolls 10 and 12 are fusion laminated along only one pair of adjacent longitudinal edges but are separated from each other throughout the remaining portions of the films by the separatory foil. The films can be unfolded to open out into a single large sheet, which may be about double the width of calender rolls in the case where the films themselves are about the width of the rolls. Reinforced sheets can also be made in the manner described above.

It is to be understood that sheets more than approximately twice the width of the calender rolls can also be made by the process of this invention. Referring to FIG. 1, this can be accomplished by means of a third roll similar to rolls 11 and 12 which may be positioned with respect to the moving carrying surface of roll 10 to form a third nip through which the composite of films 1 and 2 and foil 3 pass. A third bulk of thermoplastic material may be deposited at this third nip through which the material may be calendered directly onto film 2; however, a second separatory foil is introduced between the surface of film 2 and the third bulk of material, for example, by means of another feeder roll similar to feeder roll 13 in a manner similar to the application of foil 3 against the surface of film 1. This second separatory foil is positioned so that a longitudinal edge thereof is exactly coincident with, or extends beyond, the pair of longitudinal edges of films 1 and 2 which have been fusion laminated together at the previous nip between rolls 10 and 12. Obviously, this step in the process can be repeated at subsequent similar nips as many times as is desired and within practical limits. The sheet so produced can then be unfolded in accordion-like fashion to an overall width several times wider than the widths of the calender rolls. In a related manner, it is also obvious that multi-channel tubing can also be made merely by positioning each separatory foil between each of the films so that the films as calendered extend beyond the longitudinal edges of the separatory foils.

FIG. 4 is a planar view, in part, of a multi-tubular product calendered directly from bulk thermoplastic material in accordance with this invention. Each tubular portion is similar in structure to the single tube shown in FIGS. 2 and 3. The films 1 and 2 forming the walls of the tubes are laminated together at the portions 4 of the films extending along the longitudinal edges of each of the three foils, all designated as 3a as shown in FIG. 4. Instead of introducing a single strip of cellophane foil 3 into the nip between the bulk polyethylene 2 and the film 1, as explained with reference to FIG. 1, the individual cellophane foil strips 3a are introduced around feeder roll 13 and applied against the surface of film 1. The foil strips 3a are spaced apart from each other in substantially parallel alignment. The foil strips initially adhere to the tacky surface of the film 1 and thus are held in the same relative alignment while the foil strips are led into the second nip to form a multi-tubular product as shown in FIG. 4.

Mono- and multi-tubular products can be made in any length desired in accordance with this invention. Additional bulk thermoplastic material is supplied to the nips as the banks of the material are depleted during the process. Separate sections of predetermined length may be produced by precutting the foil 3 or strips of foil 3a to the desired length prior to introduction into the second nip. A multi-tubular product suitable for use as an air inflatable mattress, for example, can be easily produced in this manner. A product of this type can be produced by the use of a precut foil pattern comprised of a number of parallel foil strips, such as foil strips 3a which may be joined together at at least one end of the strips. This precut foil pattern is introduced into the second nip in the manner described. The result is a multi-tubular product wherein the tubular portions are interconnected with each other and may be inflated by means of an air valve which can be attached and fixed to a wall of the product. Thus, it is possible to manufacture products of a predetermined pattern directly from bulk material in a single-pass calendering operation.

A further specific example of the process of this invention is graphically illustrated in FIGURES 5 and 6, which show the continuous production of polyethylene bags directly from bulk polyethylene. FIGURE 5 is a calendering apparatus similar to the apparatus shown in FIGURE 1. The temperatures of the top roll 11, center roll 10 and bottom roll 12 are the same as described with reference to FIGURE 1. The films are formed at the two nips in the same manner as previously described. The numeral 6 designates cellophane bag-pattern foils. The foils 6 are placed on a belt conveyor comprised of an endless belt 15 and a pair of rotating rolls, only roll 14 of which is shown. The conveyor belt 15 is driven to move in a direction toward the exposed surface of film 1 and around roll 14. The patterns 6 are placed upon the conveyor belt 15 in substantially parallel and spaced-apart relationship to each other. The patterns 6 are then successively brought up against the exposed surface of film 1 by means of the conveyor belt. Due to the tacky characteristics of the exposed surface of the film, the patterns 6 adhere thereto and are thereby transferred from the conveyor belt to film 1. The patterns 6 are then successively carried into the second nip between the exposed surface of film 1 and the bulk thermoplastic material 2, in the same manner as previously described for the other foils. In this instance the patterns 6 are positioned with respect to films 1 and 2 so that one edge of the patterns overlaps or extends beyond one of the adjacent longitudinal edges of the films 1 and 2.

FIGURE 6 illustrates a portion of the product as it emerges from the second nip between rolls 10 and 12. The films 1 and 2 are fused together in the areas 7 which extend beyond and between the edges of the patterns 6. In one instance the bag-pattern 6 is shown in the process of being removed from between the films 1 and 2. As removed, the bag-patterns 6 can be collected and returned to the station for feeding the patterns on to the conveyor belt 15.

The bags are then cut from the laminated films along a line parallel to the outline of the bag-pattern. This may be done in a continuous in-line station to which the laminated product of FIGURE 6 is led directly from the aforesaid second nip. Alternatively, after the bag-patterns have been removed, the laminated films may be wound up on an appropriate spool to be removed and cut into individual bags as needed. The final product is a polyethylene bag which has been processed directly from bulk polyethylene material in a single-pass calendering operation.

The process of this invention is also particularly suitable for the manufacture of paper-polyethylene laminate bags. Thus, a series of pairs of paper bag patterns may be substituted for the cellophane bag patterns in the process described with reference to FIGS. 5 and 6. In this case the polyethylene films, or other thermoplastic material, as noted previously, may be laminated directly to the surface of the bag patterns which are brought into contact with the films. The calendering conditions are suitably adjusted to prevent strike-through of the polyethylene between the interstices of the paper fibers or, the confronting sides of each pair of patterns to prevent alternatively, the paper bag patterns may be coated on strike-through. Another alternative is to insert a releasable separatory foil, as explained above, between the patterns. A particularly advantageous feature of this invention is that such paper bag patterns may be preprinted and, therefore, serve an informative or decorative purpose, when the thermoplastic material is a clear material, in addition to reinforcing the walls of the bags.

It is to be understood that this invention is not dependent upon the specific composition of the film thermoplastic material or the composition of the separatory foil. Rather, the invention is based upon the manipulative steps or operations correlated in the manner set forth in the claims. The composition or type of the separatory foil materals is primarily dictated by the melting point characteristics of the film thermoplastic material and the choice thereof in each instance will be obvious to those skilled in the calendering art in view of the above disclosure. The physical characteristics of the surface of the foils necessary to assure separation have been explained. The temperatures at which the calendering operation is conducted, of course, must not exceed the melting point or fusion temperature of the separatory foil if the materials used for such foils are themselves thermoplastic or otherwise affected by temperature. Within this framework of operating conditions, the temperature of each bank of bulk thermoplastic material must be at or above the melting point of the material. After the first nip, the temperature of each successive bank of bulk thermoplastic material is preferably above the melting point of the material forming the preceding film in order to obtain a strong fusion bond between the films. Preferably, the moving carrying surface, such as center roll 10, is maintained at as high a temperature as is consistent with adequate surface viscosity and smooth, clean stripping from the carrying surface. The carrying surface, of course, must always be moving. The converging surfaces, such as the surfaces of rolls 11 and 12, may either be moving or stationary. If the temperature of the carrying surface is lower than the temperatures of the converging surfaces, easiest operation is obtained with the carrying surface moving at a rate at least somewhat faster than the rates of the converging surfaces. Within practical limits the films will ordinarily adhere to the carrying surface when the carrying surface is at a temperature higher than the converging surfaces, regardless of the relative rates of surface speed. Ordinarily, however, operation of the process with the carrying surface at a temperature above the melting point of the film thermoplastic materials is to be avoided unless the melt viscosity or cohesive strength of the thermoplastic material is such as to permit stripping of the film from the carrying surface.

Since various embodiments in the invention will be apparent from the foregoing disclosure, it is to be understood that the disclosure is to be interpreted as illustrative and not in a limiting sense, otherwise than as specified in the claims.

What is claimed is:

1. A process for calendering hollow tubing comprising, in a process wherein a molten bulk of nonthermosetting thermoplastic material is deposited at each of at least two separate successively spaced apart converging surfaces adjacent to a common moving carrier surface to form successive nips therewith through which a film emerges from each bulk of thermoplastic material, the film emerging from the first of said successive nips releasably adhering to the moving carrier surface and the films emerging from subsequent successive nips each superposing the film emerging from the previous nip, the steps in combination therewith of: (a) introducing and passing a preformed separatory releasable foil between the bulk of thermoplastic material at at least one nip and the film emerging from the nip immediately preceding said one nip by applying said separatory releasable foil onto exposed thermally softened tacky surface of said film at a point intermediate the preceding nip and said one nip prior to contact with the molten bulk of thermoplastic material at said one nip, said foil being carried thereon into and through said one nip, the foil being narrower than the superposed films emerging from said one nip; (b) positioning the narrow separatory releasable foil as it is applied on said film so that it is between the longitudinal edges of the superposed films emerging from said one nip; (c) fusing to the film from said preceding nip the film formed from the bulk of thermoplastic material at said one nip as it is formed at said one nip only in the areas along the longitudinal edges thereof beyond the edges of the narrow separatory foil; and (d) stripping the tubing in collapsed form from the moving carrier surface after emerging from the last of such successive converging surfaces.

2. The process of claim 1 wherein the separatory foil is adhered to one of the films between which it is interposed.

3. The process of claim 1 wherein the thermoplastic material is polyethylene.

4. A process for calendering containers having one open end comprising, in a process wherein a molten bulk of non-thermosetting thermoplastic material is deposited at two separate successively spaced apart converging surfaces adjacent to a common moving carrier surface to form successive nips therewith through which a film emerges from each bulk of thermoplastic material, the film emerging from the first of said successive nips releasably adhering to the moving carrier surface and the film emerging from the subsequent successive nip superposing the film emerging from the first nip, the steps in combination therewith of: (a) introducing and passing a preformed separatory releasable foil between the bulk of thermoplastic material at said subsequent nip and the film emerging from the first nip by applying said separatory releasable foil onto exposed thermally softened tacky surface of said film at a point intermediate said first and subsequent nips prior to contact with the molten bulk of thermoplastic material at said subsequent nip, said foil being carried thereon into and through said subsequent nip, said foil having the shape of a bag panel; (b) positioning said separatory releasable foil as it is applied on said film so that it extends beyond a portion of adjacent longitudinal edges of the superposed films emerging from said one nip, the films otherwise extending beyond the other edges of said foil; (c) fusing to the film from said first nip the film formed from the bulk of thermoplastic material at said subsequent nip as it is formed at said nip only in the areas thereof extending beyond the edges of said separatory releasable foil; and (d) thereafter stripping the superposed films from the moving carrier surface.

5. The method of claim 4 wherein said separatory foil is adhered to one of said films between which it is interposed.

6. The process of claim 4 wherein the thermoplastic material is polyethylene.

7. A process for calendering sheeting having a width greater than the width of the surface upon which the sheeting is produced comprising, in a process wherein a molten bulk of non-thermosetting thermoplastic material is deposited at each of at least two separate successively spaced apart converging surfaces adjacent to a common moving carrier surface to form successive nips therewith through which a film emerges from each bulk of thermoplastic material, the film emerging from the first of said successive nips releasably adhering to the moving carrier surface and the films emerging from subsequent successive nips each superposing the film emerging from the previous nip, the steps in combination therewith of: (a) introducing and passing a preformed separatory releasable foil between the bulk of thermoplastic material at at least one nip and the film emerging from the nip immediately preceding said one nip by applying said separatory releasable foil onto exposed thermally softened tacky surface of said film at a point intermediate the preceding nip and said one nip prior to contact with the molten bulk of thermoplastic material at said one nip, said foil being carried thereon into and through said one nip; (b) positioning said separatory releasable foil as it is applied on said film so that a longitudinal edge thereof extends beyond the longitudinal edges of the films at one side of said nip, the parallel longitudinal edge of said foil extending short of the parallel longitudinal edges of said films at the other side of said one nip; (c) fusing to the film from said preceding nip the film formed from the bulk of thermoplastic material at said one nip as it is formed at said one nip only in the areas along the longitudinal edges thereof not separated by said foil; and (d) thereafter stripping the superposed films from the moving carrier surface after emerging from the nip at the last of said converging surfaces.

8. The process of claim 7 wherein the thermoplastic material is polyethylene.

9. A process for manufacturing superposed thermoplastic films fused together only in certain areas in a predetermined pattern comprising, in a process wherein a molten bulk of non-thermosetting thermoplastic material is deposited at each of at least two separate successively spaced apart converging surfaces adjacent to a common moving carrier surface to form successive nips therewith through which a film emerges from each bulk of thermoplastic material, the film emerging from the first of said successive nips releasably adhering to the moving carrier surface and the films emerging from subsequent successive nips each superposing the film emerging from the previous nip, the steps in combination therewith of: (a) introducing and passing a sepratory releasable foil of a predetermined pattern between the bulk of thermoplastic material at at least one nip and the film emerging from the nip immediately preceding said one nip by applying said foil onto the exposed surface of the film emerging from the nip immediately preceding said one nip at a point intermediate said preceding nip and said one nip and being carried thereon into said one nip; (b) positioning said separatory releasable foil while it is introduced at and passed through said one nip to separate a portion of the surface of the film formed from the bulk of thermoplastic material at said one nip from the surface of the film emerging from the immediately preceding nip; (c) fusing to the film from said preceding nip the film formed from the bulk thermoplastic material at said one nip as it is formed at said one nip only in the areas around the foil pattern between said films; and (d) thereafter stipping the superposed films from the moving carrier surface after emerging from the nip at the last of said converging surfaces.

10. The process of claim 9 wherein said separatory foil is adhered to one of the films between which it is interposed.

References Cited in the file of this patent
UNITED STATES PATENTS

| | | |
|---|---|---|
| 894,790 | Ackerman | July 28, 1908 |
| 1,402,288 | Fisher | Jan. 3, 1922 |
| 2,372,735 | Palmer | Apr. 3, 1945 |
| 2,563,316 | De Sylva | Aug. 7, 1951 |
| 2,621,139 | Messing | Dec. 9, 1952 |
| 2,737,467 | Massey | Mar. 6, 1956 |
| 2,739,093 | Bull | Mar. 20, 1956 |
| 2,742,388 | Russell | Apr. 17, 1956 |
| 2,746,898 | Buckwalter et al. | May 22, 1956 |
| 2,748,048 | Russell | May 29, 1956 |
| 2,781,820 | Rogers | Feb. 19, 1957 |
| 2,786,792 | Mikiska | Mar. 26, 1957 |
| 2,879,547 | Morris | Mar. 31, 1959 |